April 15, 1941.  J. P. NORTON  2,238,426
BEARING STRUCTURE
Filed May 9, 1939
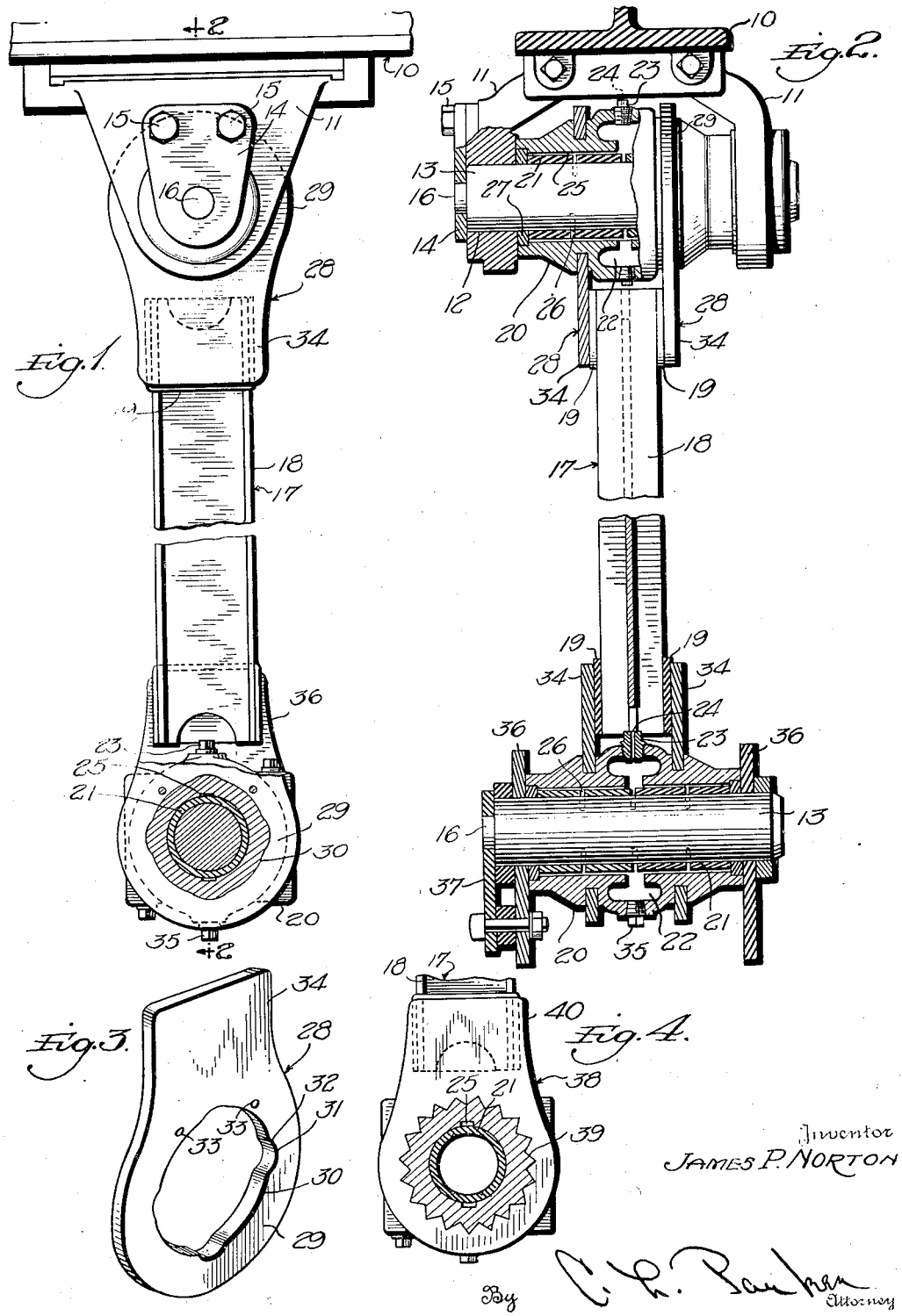
Inventor
JAMES P. NORTON Patented Apr. 15, 1941

2,238,426

UNITED STATES PATENT OFFICE 2,238,426

BEARING STRUCTURE

James P. Norton, Beverly, Mass., assignor to The Parkersburg Rig & Reel Company, Parkersburg, W. Va., a corporation of West Virginia Application May 9, 1939, Serial No. 272,687

2 Claims. (Cl. 308—15)

This invention relates to bearing structures, and more particularly to a bearing for use in the pitman constructions employed in oil well pumping apparatus.

While the invention is of general application in bearings and analogous structures it is particularly advantageous for use in connection with the driving of mechanisms wherein the bearings are subjected to substantial shock loads as is true, for example, in the pitman connections of oil well pumping units.

In such a construction the take-off pitman is subjected to constant shock loads during the pumping operations and frequently the pitman is placed alternately in tension and compression, thus reversing the shock loads on the bearings. It is therefore desirable and in fact almost essential that the bearings be made into integral assemblies with the pitman stems.

In the past attempts have been made to attach pitman and similar bearings to the structural member which supports them by means of bolts, key arrangements, etc. Such methods of attachment have never proved to be very satisfactory since the bearings have a tendency to work loose and there is always the danger that the attachment bolts may fail from fatigue or from being pulled up too tight. Failure of the bearing connection can easily cause the failure of the entire pumping rig and also cause losses due to the loss of production of oil, etc.

A bearing design can be worked out to overcome these difficulties by using accurately machined fits, etc. that would assure the bearing attaching means remaining tight, but the expense of such a design is prohibitive. It also would be possible to make a design using such large attaching bolts or pins that the possibility of failure could be eliminated. However, the expense of such a design also would be prohibitive especially if, in addition, precision machined fits were also employed. If precision machined fits and generous load supporting surfaces were not used the connections would soon work sufficiently loose to cause objectionable relative movement and knocks while in service.

It has been found that the most satisfactory and practical construction in the past has been to employ cast steel bearing housings and to weld the structural steel members directly to the housings. However, cast steel bearing housings are also open to objections. The welding of cast steel, especially when the surfaces to which the weld is to be applied are not machined, requires considerable skill. Sand inclusions, small blow holes, etc., in the castings make it particularly difficult to lay a good weld and one that is homogeneous with the metal of the parts being welded.

Moreover, steels of different carbon content also are difficult to weld together as any appreciable difference in carbon content necessitates some difference in welding technique. The structural elements to which the bearing housings are connected are usually formed of rolled structural steel having a relatively low carbon content. The carbon content of the steel castings from which the housings are made is not uniform from one casting to another and at times may be considerably higher than that of rolled steel. Moreover, aside from the difficulty of laying a smooth-appearing weld on cast steel, it is generally impossible to tell from the appearance of the weld how good the weld may be and with cast steel parts reliance must be placed upon the skill of the welder for any assurance that the calculated load capacity of the weld will be obtained.

It is impracticable in most structures of this kind to consider X-raying or making similar tests on the welds to determine the character thereof. A defective weld obviously may fail of fatigue under load. Moreover, applying heat to a cast steel bearing housing may result in warpage of the casting and misalignment of the bearing bores. To avoid this it is frequently necessary to design housings, which are to be welded, so that the welded surfaces are an appreciable distance from the bearing bore, thus resulting in a larger and more expensive bearing than would otherwise be required.

An important object of the invention is to provide a novel bearing structure which combines the use of a cast iron casting with steel inserts of such nature and form as to provide a finished bearing structure which readily may be connected to the structural element associated therewith.

A further object is to provide a bearing structure of this character wherein all loads are transmitted through the steel inserts and wherein the cast iron casting is relieved of all tensile loads, thus permitting the use of a lighter bearing structure.

A further object is to provide a bearing structure wherein the steel inserts completely surround the shaft associated with the bearing whereby it is adapted to transmit all loads between the shaft and the structural element to which the bearing is connected, the structure lending itself particularly well to the withstanding of shock loads regardless of the direction of application of such loads around the axis of the bearing.

A further object is to provide a bearing structure of this character wherein the steel inserts may be made of the same form of steel as the structural element to which the bearing structure is to be connected, for example, rolled structural steel, thus facilitating the provision of an efficient weld between the steel inserts and the structural element referred to.

A further object is to provide a bearing structure wherein the steel inserts will be bonded to the cast iron casting and wherein the only torque required to be transmitted by the bond between the inserts and casting is that necessary to overcome the friction of the bearing, which is relatively small.

A further object is to provide such a bearing wherein the nature of the inserts is such as to provide a keying effect between the inserts and the casting.

Other objects and advantages of the invention will become apparent during the course of the following description.

In the drawing I have shown two embodiments of the invention. In this showing:

Figure 1 is a side elevation of a pitman connection employed in oil well pumping apparatus, parts being broken away and parts being shown in section, Figure 2 is a section on line 2—2 of Figure 1, parts being broken away and parts being shown in elevation, Figure 3 is an enlarged detail perspective view of one of the steel inserts, and, Figure 4 is a detail sectional view approximately in the plane of one of the inserts showing a modified form of insert.

Referring to the drawing the numeral 10 designates any form of structural element to which power is to be applied such as the walking beam of an oil well pumping apparatus. The structural element 10 is shown as being provided with depending spaced ears 11 apertured as at 12 to receive a shaft 13 through which the power is transmitted to the element 10. A depending arm 14 is carried by one of the ears 11 and is fixed thereto as at 15, the arm 11 having a close fit with a reduced extension 16 on the end of the shaft to prevent the turning of the shaft with respect to the ears 11.

The invention is shown as being applied to the upper and lower ends of a pitman indicated as a whole by the numeral 17. This pitman is shown as being in the form of a structural member 18 preferably of rolled I-beam section. At the upper end of the body of the pitman, filler blocks 19 are welded to the edges of the flanges of the pitman body to provide seats to which are connected the inserts to be described. The plates 19 also are preferably formed of rolled steel and may be omitted where the pitman or other structural element presents surfaces of sufficient area to be directly welded to the inserts, as will become apparent.

A cast bearing body 20, preferably formed of cast iron, is arranged between the lower ends of the ears 11 and carries a bearing bushing 21 receiving the shaft 13. The cast body 20 is formed to facilitate lubrication of the bearing surfaces. It will be noted that the bearing body is provided with a lubricant receiving chamber 22 into which lubricant may be introduced by the removal of a plug 23 preferably vented as at 24. The cast body is formed with longitudinal lubricant passages 25 for supplying lubricant to radial lubricant openings 26 formed in the bushing 21. Lubricant packing 27 may be arranged in the cast body 20 at the ends of the bushing 21.

A pair of steel inserts each indicated as a whole by the numeral 28 are cast in the body 20 of the bearing and are employed for transmitting forces between the shaft 13 and pitman body 18. One of the inserts is shown in detail in Figure 3 and comprises a substantially circular body 29 having a general circular opening 30 therein which, when cast into the body 20, has its axis concentric with the axis of the bushing 21. The opening 30 is preferably irregularly shaped to provide the effect of keying it with respect to the cast body 20, the opening 30 preferably being so shaped as to facilitate the flowing of the metal from which the casting 20 is made into the opening 30, and this opening preferably is also so shaped as to avoid any concentration of stress in corners. As shown in Figure 3, therefore, the edges of the opening 30 are arcuately cut back as at 31 to form recesses to receive the metal of the housing 20, and these recesses join the main portion of the opening 30 by curved surfaces 32 thus eliminating any edges in the opening 30. If desired, each insert may be provided with additional small openings 33 into which the metal of the body 20 can flow to provide an additional anchoring effect between the inserts and the cast body 20. These openings are not necessary and the metal flowing thereinto is not relied upon to carry any load.

Each insert is provided with a radial extension 34 preferably slightly wider than its associated plate 19 or other surface to which it is to be connected. The housing 20 is provided with two inserts of the character referred to and the space between the projections of these inserts is equal to the space between the remote faces of the plates 19 and are welded thereto. The inserts are preferably made of rolled steel and may be flat as indicated in Figures 2 and 3. The plates 19 and pitman body 18 are also made of rolled steel, and accordingly the projections 34 may be readily and efficiently welded to the plates 19. The similarity in the material of the pitman body 18 and plates 19 likewise facilitates the welding of the plates 19 to the pitman body 18 when the plates 19 are employed. It will be noted that the circular portion of each insert completely surrounds the bushing 21 and is spaced therefrom by the intervening body of cast iron within each opening 30. Accordingly any forces transmitted radially to or from the inserts will be taken up by the inserts without transmitting any tensile strains whatever to the cast body 20.

A similar bearing structure may be arranged at the lower end of the pitman body 18. As a matter of fact, the lower bearing structure may be substantially identical with the bearing structure just described and need not be referred to in detail. Accordingly similar parts have been designated by the same reference numerals. If desired, each bearing housing may be provided with a plug 35 from which lubricant may be drained from the chamber 22, such a plug being shown in connection with the lower bearing structure.

The shaft 13 of the lower bearing structure may be connected to any desired element through which the pitman may be driven or to which the pitman may transmit power. In the present instance, the structure to which the lower shaft 13 is connected has been represented by a pair of plates 36 surrounding the shaft 13 and welded or otherwise connected to the body of the structure referred to. One of the plates 36 is connected with an arm 37 similar to the arm 14 previously described, and operative for preventing turning movement of the shaft 13 with respect to the elements 36.

The openings 30 in the inserts referred to need not be of any particular shape or contour but they are preferably other than round so as to obtain a keying effect with respect to the casting so that the bond between the inserts and the casting does not have to be relied upon to transmit torque. Obviously the opening 30 may be made in an infinite number of shapes. If desired, the shape of the opening may be such as to increase the fusing or bonding of the steel inserts with the cast iron casting as well as to provide the desired keying effect.

For example, an insert plate may be made as shown in Figure 4 and indicated by the numeral 38, the insert being provided with an opening 39 formed with a series of teeth around the circumference of the opening so that the points projecting radially inwardly will be raised more definitely to the fusing temperature of the metal by the molten iron from which the bearing body 20 is cast. The insert in Figure 4 is otherwise similar to the insert previously described, being provided with the projecting portion 40 by which the insert may be welded to its adjacent structure.

The operation of the construction will be apparent from the foregoing description. The steel plates 28 are set directly in the mold before the bearing body 20 is cast. When the iron is poured, it flows around the plates 28 and into the openings 30, and shrinks against and fuses with the steel of the inserts. As a further assurance that the inserts will remain tightly in position, if by any chance they do not bond with and in fact become integral parts of the bearing housing by fusion of the metal, the irregular shaping of the opening 30 insures a keying effect between the inserts and the bearing body.

The only torque required to be transmitted by the bond between the inserts and the casting is that necessary to overcome the friction of the bearing and this friction, for normal operation, is relatively small. However, the keying effect between the inserts and the bearing body is sufficient to overcome increased bearing friction in the event the bearing is set up too tightly. Therefore the bonding effect between the parts need not be wholly relied upon, but such bonding actually does take place so that the bearing structure is, in effect, an integral structure.

Particular attention is invited to the fact that the steel inserts form rings completely surrounding the casting, the opening in each plate being preferably symmetrical and generally concentric with the axis of the bearing to uniformly transmit forces between the shaft and the steel inserts. Forces exerted in any direction are transmitted by the steel inserts. For example, in the pitman arrangement shown the pitman body may be placed under either tension or compression and in either case the steel inserts at the upper end of the pitman will directly transmit the forces radially to the shaft 13 to operate the walking beam or other structure 10. The cast iron of the body 10, therefore, is never required to transmit any tensile load. The steel inserts therefore act as force transmitting elements and they also reinforce the cast iron. Accordingly, since it is not required to carry the load, the casting need not be of high strength cast iron and can be made as light in section as other details of the design permit.

The present construction also effects a very appreciable saving in cost. It will be evident that in comparison with an all cast iron design there is a considerable saving in the size and weight of the casting due to the reinforcing of the casting by the steel inserts and by the transmission of forces through the inserts. The construction also permits the load transmitting inserts and their projections 34 to be made of the same material as the structural elements to which they are to be welded, thus permitting the laying of a perfect weld and eliminating the necessity for the use of attaching bolts or other similar devices.

As compared with an all cast steel bearing structure the present construction also effects some saving in size and weight. As the construction lends itself to a simpler design, a very appreciable saving in cost is effected due to the fact that cast steel usually costs from four to five times that of cast iron or rolled steel.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A bearing structure for a pitman of a deep well pumping mechanism, comprising a cast body having a bushing therein, and a pair of spaced rigid parallel inserts embedded in said cast body intermediate the ends thereof and perpendicular to the axis of said bushing, said inserts being formed of a readily weldable metal of higher tensile strength than said cast body and each comprising a substantially circular portion surrounding the axis of said shaft concentric therewith, the circular portion of each insert having a concentric opening of greater diameter than the internal diameter of said cast body whereby the metal of the latter extends through such opening, said cast body at each side of each insert being of greater diameter than the opening in said insert whereby the metal of said body extends over and circumferentially around at least a portion of each side face of said inserts, said inserts having attachment portions extending radially outwardly of said cast body.

2. A bearing structure for a pitman of a deep well pumping mechanism, comprising a cast body having a bushing therein, a pair of rigid flat spaced parallel inserts embedded in said cast body at points spaced from the ends thereof and perpendicular to the axis of said bushing, said inserts being formed of a readily weldable metal of higher tensile strength than said cast body, each insert comprising a substantially circular portion surrounding the axis of said shaft concentric therewith and having a concentric opening of greater diameter than the internal diameter of said cast body whereby the metal of the latter extends through such opening, said cast body at each side of each insert being of greater diameter than the opening in the insert whereby the metal of the body extends over and circumferentially around at least a portion of each side face of each insert, said inserts having attachment portions extending radially outwardly of said cast body, and a rigid structure extending radially from said cast body and having an end portion provided with parallel outer face portions arranged between and welded to said attachment portions.

JAMES P. NORTON.